(12) United States Patent
Shuster et al.

(10) Patent No.: US 8,290,948 B2
(45) Date of Patent: Oct. 16, 2012

(54) METHOD AND APPARATUS FOR CONTENT FILTERING

(75) Inventors: Gary Stephen Shuster, Fresno, CA (US); Brian Mark Shuster, Stateline, NV (US)

(73) Assignee: Hoshiko, LLC, Henderson, NV (US)

( * ) Notice: Subject to any disclaimer, the term of this patent is extended or adjusted under 35 U.S.C. 154(b) by 2400 days.

(21) Appl. No.: 10/882,718

(22) Filed: Jun. 30, 2004

(65) Prior Publication Data
US 2005/0120042 A1  Jun. 2, 2005

Related U.S. Application Data

(60) Provisional application No. 60/484,237, filed on Jun. 30, 2003.

(51) Int. Cl.
*G06F 7/00* (2006.01)
*G06F 17/30* (2006.01)

(52) U.S. Cl. .................................... 707/731; 707/754

(58) Field of Classification Search ............. 707/1–10, 707/100–104.1, 200–205, 731, 754
See application file for complete search history.

(56) References Cited

U.S. PATENT DOCUMENTS

| | | | | |
|---|---|---|---|---|
| 5,867,799 A * | 2/1999 | Lang et al. | | 707/1 |
| 5,912,696 A * | 6/1999 | Buehl | | 725/28 |
| 6,236,395 B1 * | 5/2001 | Sezan et al. | | 715/723 |
| 7,143,091 B2 * | 11/2006 | Charnock et al. | | 707/5 |
| 2005/0004905 A1 * | 1/2005 | Dresden | | 707/3 |
| 2006/0224526 A1 * | 10/2006 | Klug | | 705/410 |

* cited by examiner

*Primary Examiner* — Hosain Alam
*Assistant Examiner* — Navneet K Ahluwalia

(57) ABSTRACT

A method for filtering content makes use of local filtering agents for end users, and a portal to a network of human reviewing resources. Local filtering agents request content classification for unclassified content. The portal routes requests from local agents to available human reviewing resources. A content classification is provided by the reviewing resources, and may be saved in association with a content identifier for future use. The method permits human review of content within a short period after review is requested. In an embodiment of the invention, a centrally-located switch is provided for controlling filtering levels at one or more user terminals.

20 Claims, 2 Drawing Sheets

METHOD AND APPARATUS FOR CONTENT FILTERING

CROSS-REFERENCE TO RELATED APPLICATION

This application claims priority pursuant to 35 U.S.C. §119(e) to U.S. Provisional Application No. 60/484,237, filed Jun. 30, 2003, which application is specifically incorporated herein, in its entirety, by reference.

BACKGROUND OF THE INVENTION

1. Field of the Invention

The present invention relates to methods and apparatus for filtering content delivered to end users over a wide-area network, for example, filtering to prevent inappropriate adult-oriented materials from being accessed by children using public or privately-shared terminals.

2. Description of Related Art

Various methods are known for detecting and restricting access to undesired information distributed over wide area networks. Such methods may employ automatic keyword analysis to identify and classify written materials, and pattern recognition for classifying images. Such methods, however, suffer from the deficiency of being easily fooled or inadvertently misclassifying information, and therefore being over inclusive or under inclusive. For example, authors of "spam" messages may readily avoid spam filters by inserting a few random characters in a text string, rendering it unrecognizable to a filter but still easily understood by a human being. At the same time, it is not generally desirable for an automatic filter to screen out every bit of questionable information, as this would impede the benefit of connecting to a wide area network in the first place.

Likewise, image pattern recognition may not be able to distinguish tasteful artistic or educational images from obscene materials. Pattern recognition algorithms may also be fooled to overlook targeted classes of images by including random information in an image, or by breaking an image into pieces. Meanwhile, a human reviewer may have little difficulty in discerning an intended obscene image that an automatic pattern recognition algorithm is unable to recognize. Consequently, automatic filtering methods are often relatively ineffective in screening out undesired content, such as obscene or pornographic content, or unsolicited "spam."

Even apart from the effectiveness of filtering algorithms, a further problem arises in the operation of network terminals that are accessed by different classes of people. For example, a terminal may be operated at a library or other public area for use by patrons. Such patrons may include adults or children, and it may be desirable to screen certain content for children but not for adults. Essentially the same problem may be encountered in a home, where a single terminal may be shared by members of the household of various different ages or information requirements. One or more persons, for example, a librarian, may be responsible for ensuring that the public terminal is not used inappropriately, while still being available to access unfiltered (or differently-filtered) content by qualified persons. Such persons may find that turning the filtering on or off, or otherwise adjusting filtering levels for the public terminals under their control, is too time-consuming and inconvenient.

It is desirable, therefore, to provide a methods and apparatus for network filtering that overcomes these deficiencies.

SUMMARY OF THE INVENTION

The present invention provides a method and apparatus for network filtering that is more accurate in filtering out undesired content. In an embodiment of the invention, an apparatus is provided to make the adjustment of filtering more convenient and less time-consuming for a custodian of shared terminals.

In an embodiment of the invention, a software agent is placed on an end user terminal, or somewhere between an end user terminal and wider network content that is sought to be filtered. For example, the agent may be placed on network servers for an internet service provider, or on a mail server. The agent is configured with instructions for (a) discerning between classified and unclassified content and (b) sending unclassified content to a remote central location for verification. Optionally, the agent also performs steps for protecting the privacy of the user. These steps may include, for example, removing sensitive or personal information from the unclassified content, or protecting the identity of the person requesting the unclassified information by removing or destroying any information which may make it possible to discern the identity of the requestor.

Classified content may include, for example, information that has already been classified using the content filtering system. Classified information may also include any information from a verified or approved content provider. Many content providers have internal systems in place for ensuring that inappropriate content is not published using the providers' web addresses. Much of the most popular information on the internet may originate from such providers, for which further filtering is deemed unnecessary. An agent may be configured to let content from approved providers pass to the end user without any further verification, thereby speeding up the response of the system to information requests.

Unclassified content, optionally with personal or identifying information removed, is then processed by one or more servers for distribution to an appropriate human reviewer in near real-time. All requests for review of unclassified content may be passed through a single portal, which may be configured to prevent unnecessary duplication of content reviews by maintaining a database of classified content. If the content has already been reviewed, the portal may send a message to the agent indicating that the content is approved for viewing, and provide a code classifying the content. The agent may then compare the status of the end user with the classification code, and permit the end user to view the content if qualified. Classification codes may be used to indicate jurisdictions in which content is controlled. For example, a code may indicate that content is "adults only" in Europe or North America, and "prohibited" in China or Afghanistan. Depending on the identify or location of the end user—which is preferably known only to the local agent—the end user may be permitted to view the content, or restricted from viewing it.

Generally, it is desirable to employ a large plurality of reviewers, so that a reviewer is always available immediately, or after only a short delay. For example, the distribution server may be connected to a network of reviewing sites around the world. Unverified content may be routed to a site with immediate available capacity. Other factors may also be used to select a reviewing site. For example, some sites may specialize in reviewing content expressed in certain languages, in the review of image data, or in the review of suspected "spam" messages.

Various methods may be employed to increase efficiency and speed of the human reviewers and information throughput. For example, a plurality of images may be displayed at the same time to a single reviewer in a reduced size, for example, as "thumbnail" images. This may permit a reviewer to quickly assess and approve many images at once, while being able to quickly request and obtain a full-size view of any suspected images for a more detailed review. In addition, the initial presentation of less information for each reviewed image reduces the bandwidth requirements of the system. To reduce the likelihood of errors or intentional subversion of the system, an independent review by two or more human reviewers may be required before certain information is approved. The different reviewers may be randomly selected prior to initial review, or a reviewer may flag information for further review when confirmation of a preliminary conclusion is needed. In addition, or in the alternative, approval may be conditioned on a review by a jurisdictional specialist. For example, a certain image may be reviewed and approved for viewing in the United States, while initially being considered unclassified for users in China. When one or more requests are received for the image from China, the image may be submitted for review by a specialist in Chinese jurisdictional requirements.

To ensure adequate capacity for rapid review and avoid wasting of resources, review may be limited to information that is encountered or requested by multiple different users, while other information remains unclassified. For example, review could be postponed until a certain number of requests for a web page have been received, or the most popular requests may be handled first. The distribution portal may be configured to prioritize requests for reviews, in addition to distributing requests for review of content to the reviewing network.

Besides providing for more accurate review and filtering of content, which should greatly enhance beneficial use of wise area networks, the system may also be configured to protect the privacy of individual network users. The reviewing network on the back end of the content-checking portal may be configured to perform all reviews without any knowledge of the end users desiring to view the data. For example, all end-user identifying information may be stripped and destroyed before content to be reviewed is passed to the reviewing network. Classification codes for specific content may be retained in a network-accessible database, from whence codes may be picked up anonymously for use by local filtering agents. In general, the invention may be properly employed to filter out information that is not desired by end users, while protecting end users' rights to privately view any desired content.

In an embodiment of the invention, a custodian of a shared terminal is provided with an apparatus for conveniently controlling filtering at one or more shared network terminals from a central control location. The invention comprises one or more physical or software switches that are conveniently accessible at the central location. Each switch is provided with a communication link to a local agent for a respective one of the shared terminals. Each switch can be set in at least two distinct states, e.g., "on" or "off." For example, a three-way switch may be set to the states "child," "adult," or "unfiltered." When the switch is set to the "child" state, the local agent is configured to perform filtering of content for end users below a certain age, for example, 18 years old. In the "adult" state, the local agent is configured to permit adult content and filter illegal (e.g., obscene) content. By setting the switch to "unfiltered," the local filtering agent may be turned off, and all available content may be viewed at the terminal. Any number of different switch states may be used. The foregoing example should suffice, however, to demonstrate convenient control of shared terminals using a centrally located bank of switches.

A more complete understanding of the method and apparatus for content filtering will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method and apparatus for content filtering, that overcomes the limitations of the prior art. In the detailed description that follows, like element numerals are used to indicate like elements appearing in one or more of the figures.

Figure 1:
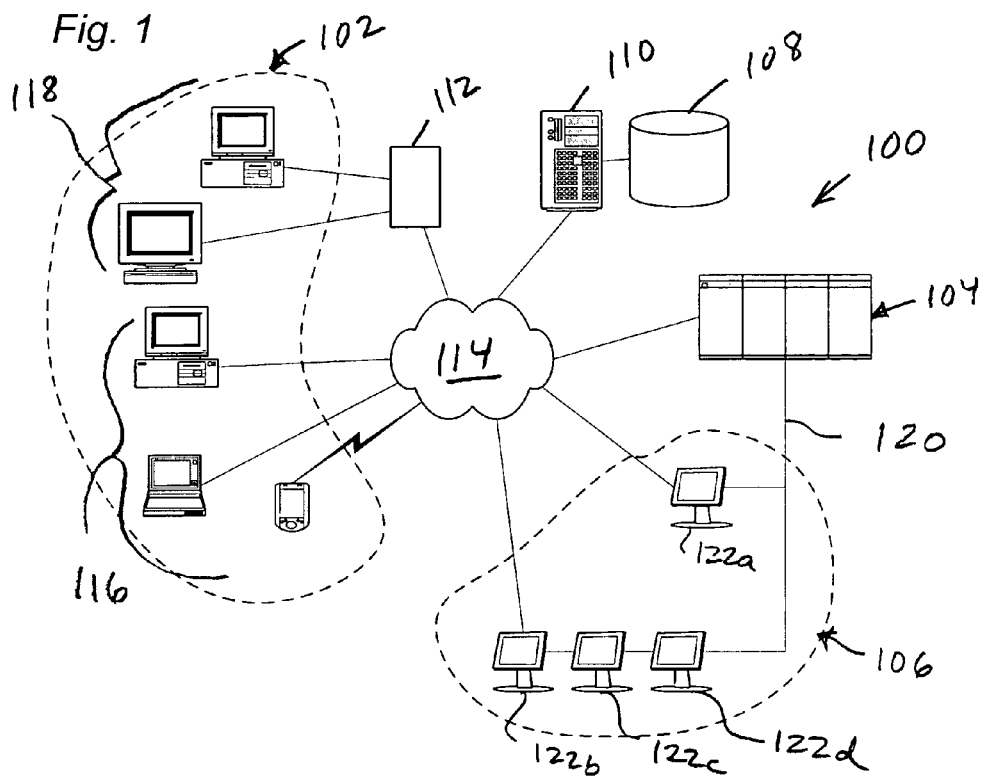
FIG. 1 is a diagram showing an exemplary system for content filtering according to the invention.

FIG. 1 shows a system 100 for content filtering, comprising a plurality of client terminals (five of many shown) used by individual users to view content provided on wide area network 114 such as the internet, a portal 104 for handling requests for human review of content, a plurality of reviewing resources 106, and a content classification database 108. Any suitable computing and networking equipment may be used to construct system 100. FIG. 1 is intended to be illustrative, and not limiting, as to the specific types of devices employed.

System 100 further comprises a local filtering agent, which may reside as software on client terminals of the system, for example, on clients 116. In the alternative, a local filtering agent may be installed on any suitable intermediate layer 112 between client terminals 118 and network 114. The local filtering agent is configured to intercept requests for content originating from the client terminal or terminals that it serves, as known in the art. The requests are then processed using any suitable method as described herein.

Reviewing portal 104 is connected to a plurality of reviewing resources 106, either using a private network 120, or via a secure connection using network 114. The reviewing resources comprise terminals 122a-d (four of many shown), which may be grouped and distributed over a remote geographic area, as desired. The terminals 122a-d are suitably configured with reviewing software and I/O equipment for presenting content items to human reviewers for review, and receiving classification information for the reviewed items.

Database 108 may be connected and operated using portal 104. In the alternative, database 108 may be operated by an independent database server 110 with its own connection to network 114. System 100 may be operated without storing classification information in a database, but storage of at least a portion of classification data is believed to enhance system efficiency.

Figure 2:
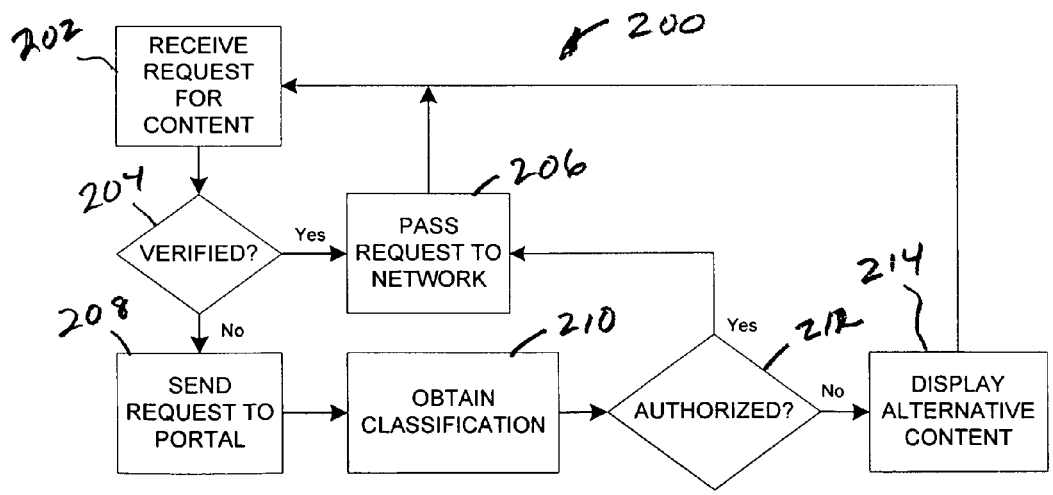
FIG. 2 is a flow diagram showing exemplary steps of a method for operating a local filtering agent.

FIG. 2 shows a method 200 for operating a local filtering agent in conjunction with other elements of system 100. Other or different steps may also be suitable, and one of ordinary skill may readily implement such steps using any suitable programming languages and methods. Being configured to intercept content requests, at step 202, the local agent receives a request for content located on the wide area network. At step 204, the agent may check to see if the request is for content from a verified source. Many commercial providers of content maintain their own controls over published content, and content from such providers may be provided without further review. These information sources may be identified in a database available to the local agent, and recognized from the network address for the requested content. Other verification methods may also be used. For example, a check of database 108 may be performed to determine whether the requested content has already been classified. If the request is for content from a verified source or has already been classified as appropriate for the access level assigned to the requesting terminal, the content request is passed to the network in a normal fashion at step 206.

If otherwise, the request is passed to a reviewing portal for further processing at step 208. The reviewing portal may be configured to handle a large volume of such requests, process the requests as desired, and route a request for content review to a human reviewer. Before sending the request to the portal, the local agent may remove any identifying information from the request so as to render it anonymous. The classification itself is handled by other elements of the system, so after passing the request on, the agent need only wait for notification that the content has been reviewed and classified. While waiting, the agent may cause a message to be provided to the end user, indicating that the content has been submitted for review.

At step 210, the local agent obtains the classification from the human reviewer. This may be done in any suitable manner. For example, the classification may be transmitted directly from the reviewing resource or the portal. More preferably, the local agent receives a notification that the classification is ready, and then obtains the classification anonymously from the database 108. The classification is associated with an identifier for the requested content, e.g., a URL, and may indicate various kinds of information, such as a legal classification for the material. For example, "adults only" "safe for children," and so forth. Classification may vary by legal jurisdiction.

At step 212, the local agent compares the classification for the content with the access level for the user terminal. The access level may be determined, for example, in association with a user identity, such as may be determined from a user account as known in the art. In the alternative, or in addition, the access level may be determined using a settable switch as described later in this specification. If the user is authorized to receive the requested information, as determined by comparing the access level to the content classification, the request may be passed to the network at step 206. In the alternative, the agent may cache the requested content while waiting for the classification to be received, and provide the cached content as soon as authorization is confirmed. If the user is not authorized to view the content, the agent may cause alternative content to be presented at step 214. For example, the agent may cause the a message to be displayed, notifying the user that the classification of the content exceeds the user's authorized access level.

Figure 3:
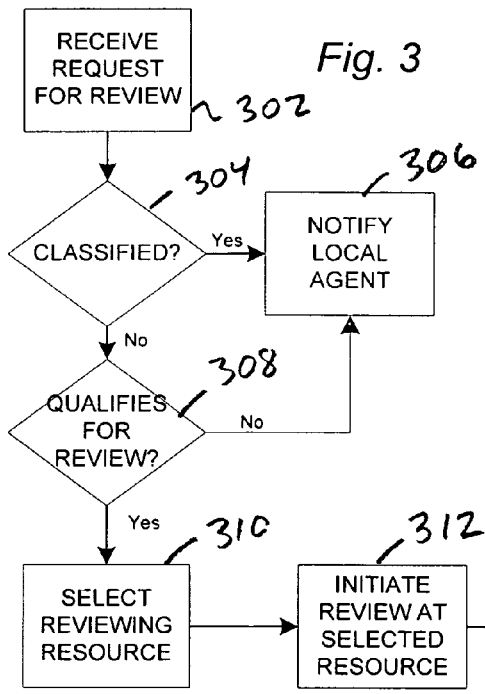
FIG. 3 is a flow diagram showing exemplary steps of a method for operating a reviewing portal.

FIG. 3 shows exemplary steps of a method 300 for handling requests for review of content, for example, such as may be performed using reviewing portal 104 of system 100. At step 302, a request for review of content is received. Such a request need only identify the content that is requested for review, for example by using a URL. To detect the use of identical URL's for different content items, some small portion of the item may be sampled and stored with the URL or other identifier to confirm identity of content. At step 304, a classification database may be queried to determine whether the requested content has already been classified. If the content has already been classified, the agent may be notified that a classification is available, or the classification may be provided directly to the agent.

If the content has not been classified, various tests may be performed at step 308, to determine whether the content qualifies for review, or what level of priority is to be assigned to it. For example, certain information sources or local agents may receive higher priority than others. For further example, priority may be assigned based on the number of requests received for particular content, or in any other desired fashion. Certain content may not qualify for review at all; for example, content that is written in a language not understood by the reviewing resources, that is otherwise not readily decipherable, or for which no qualified reviewers are available. If the content does not qualify for review, a suitable notice may be provided to the local agent at step 306.

At step 310, a suitable reviewing resource is selected. Various selection criterion may be used to make a selection. For example, legal jurisdiction, language, type of content, available reviewing capacity, and so forth, may be used to select an appropriate reviewing resource. Generally, it may be preferable to route a request for review to the first available reviewing resource that is qualified to review the content item for the jurisdiction of interest. A reviewing portal or other centralized router of requests for review may maintain communication with the reviewing resources so that available capacity is known in real time, or near real-time.

At step 314, notice of completed review may be received. In the alternative, or in addition, the classification and an associated identifier for the content item may be provided to a classification database, to the local requesting agent, to the reviewing portal, or any combination of the foregoing. In an embodiment of the invention, a classification database is updated by the reviewing resource, and notice is provided to the local agent, either directly, or via the reviewing resource at step 318. In an alternative embodiment, no notice is provided directly to the local agent, to protect the identity of the requesting user. Instead, the requesting agent may anonymously check the classification database at intervals, to receive the classification or other notice of the status of the review.

Figure 4:
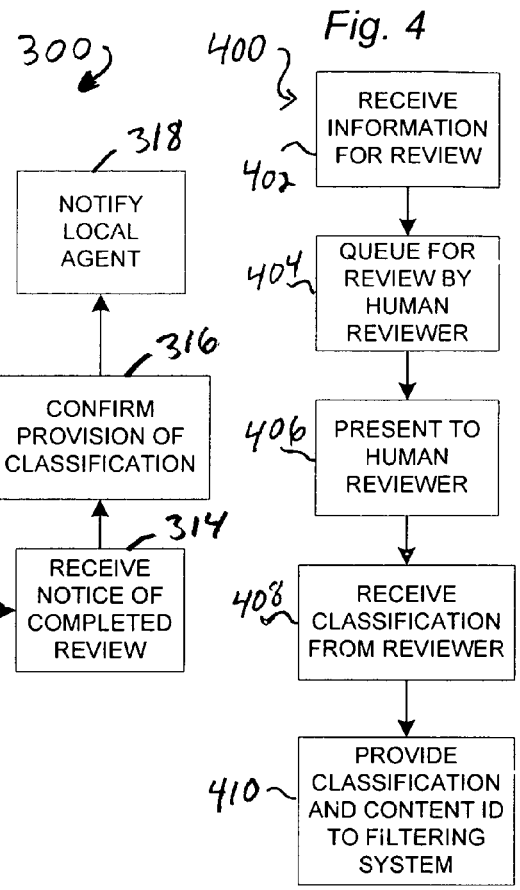
FIG. 4 is a flow diagram showing exemplary steps of a method for operating a reviewing resource using human reviewers to classify content.

FIG. 4 shows exemplary steps of a method 400 for reviewing content using a reviewing resource according to the invention. At step 402, information is obtained for review. This may comprise the entire content item, or some portion of it. In the case of content that may contain personal identifying information, for example, email messages, such information may be removed at or prior to being received by the reviewing resource. The information may also be sanitized to remove computer viruses, worms, or other undesirable executable information, prior to being accessed. If such executables are detected, their presence may be noted. For example, the content item may be classed as "infected," and no further review undertaken. Such processing may also be performed prior to providing the information to the reviewing resource. However, it may be advantageous to provide the network address for the content item to the reviewing resource, instead of the information to be reviewed. In such case, it may be advantageous for the reviewing resource to perform its own initial processing of the content item, prior to presenting it to a human reviewer.

At step 404, the reviewing resource may queue the request for review, using any suitable queuing system. It is anticipated that some reviewing resources may employ large pluralities of human reviewers, whose qualifications and areas of specialization may differ, and in communication with each other using a suitable network. One of ordinary skill may devise a suitable queuing system to ensure that a content item is expeditiously reviewed by a qualified reviewer.

At step 406, the content item, or some portion of it, is presented to a human reviewer using any suitable user interface. For example, multiple content items may be presented together as thumbnail images to a reviewer, who may then quickly select questionable items for closer review, while quickly classifying the content items not selected for further review. Various automatic or semi-automatic tools may also be used to assist a human reviewer. For example, key words may be highlighted in textual documents, or a content item may be tentatively classified using any suitable automatic method, and its classification confirmed by a human reviewer. Any other suitable user interface or method for presentation may also be used. Tools may also be provide to permit rapid consultation of multiple reviewers for difficult items, or for quality control. For example, the reviewing system may request subsequent re-classification of randomly selected items as a check on reviewers' consistency and quality of review.

At step 408, a classification is received from the human reviewer. For example, the reviewer may perform certain actions using a user interface, such as pressing defined keys on a keyboard or touching defined areas of a touchscreen, to quickly assign a classification to a content item. The review history of a given item, for example, date and person's reviewing and method of review, may be recorded. Greater weight may be given to classifications based on input from multiple reviewers or using more detailed methods of review. At step 410, the reviewing resource provides the classification assigned by a human reviewer and an associated identifier for the content item in any suitable manner as described elsewhere above.

Figure 5:
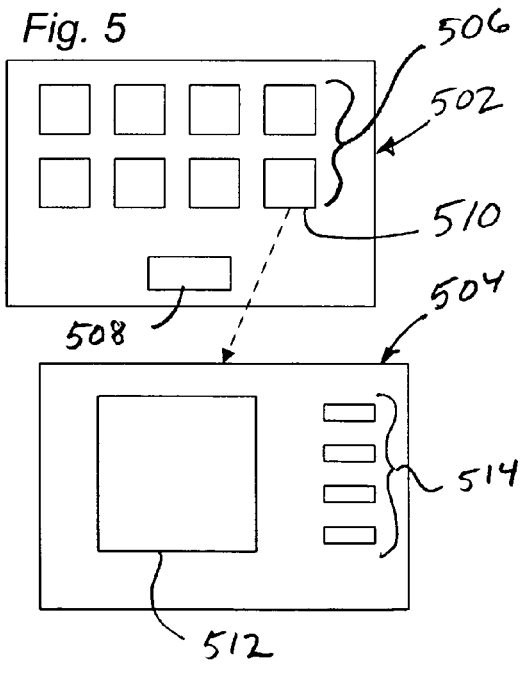
FIG. 5 is a diagram showing features of exemplary user interface display screen for use at a reviewing resource.

FIG. 5 shows, in a schematic form, exemplary screen shots 502, 504 such as may be generated by a user interface for a reviewing resource. Screen 502 shows a plurality of thumbnail images 506, each representing some portion of a content item. Many people have the ability to quickly scan a large plurality of similar items and discern the presence of exceptional or questionable material. If all the items are of the same classification, (e.g., "child-safe," "spam," "obscene"), the reviewer may confirm this quickly with a single action, such as a keystroke or selecting a touch-button 508. If a reviewer is unsure about a particular item, for example, thumbnail image 510, the reviewer may select the image, causing a second review screen 504 to appear.

Screen 504 may provide a more detailed view 512 of the content item, with a plurality of controls 514 for rapid classification of the item. For example, each of controls 514 may be used to signal a different classification for the item after a detailed review. A control button may also be used to request confirmation from another reviewer. While screen shots suitable for touchscreen devices are illustrated, any other suitable interface may also be used.

Using appropriate tools for increasing the accuracy and efficiency of human review, it is anticipated that the incremental cost of classifying a given content item may become insignificant, and readily justified by the savings associated with the detection and removal of undesirable information. Further savings may be realized by employing reviewers in areas with low labor costs.

Figure 6:
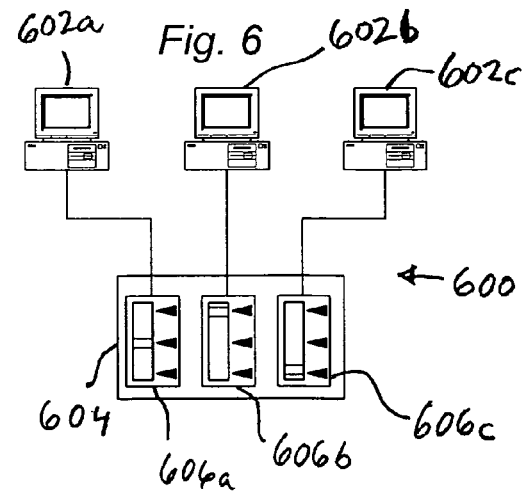
FIG. 6 is a diagram showing an exemplary apparatus for controlling user access levels according to an aspect of the invention for use with shared network terminals.

As previously described, it is necessary to define access levels at the client end of a flexible filtering system, to determine whether a given client terminal is authorized to view requested content. In the case of public or other shared terminals, ensuring that the access level is correctly set for the person currently using the terminal may be burdensome for custodians of the shared terminals. FIG. 6 shows an exemplary system 600 in which access levels for a plurality of public or shared terminals may conveniently be controlled.

System 600 comprises a plurality of client terminals 602a-c connected to a corresponding plurality of switches 606a-c. Any number of terminals and corresponding switches may be used, with each terminal corresponding to a switch. Switches 606a-b are preferably placed in a central location, such as in a bank 604, convenient for the custodian of the terminals. Switches 606a-b may be implemented as hardware switches, or as software switches whose state can be changed using a suitable user interface.

Each switch may be set in one of at least three different states. System 600 is configured such that the access level for each client terminal is determined by the state of its corresponding switch. In FIG. 6, three distinct states are shown for each switch, although the invention is not limited thereby. Terminal 602a is set to a first access level, corresponding to the state of switch 606a. Terminals 602b, c are set to second and third access levels, respectively, corresponding to second and third states of switches 606b, c. One of ordinary skill may readily implement a switching system as shown in FIG. 6 using any suitable hardware and software.

Having thus described a preferred embodiment of a method and apparatus for content filtering, it should be apparent to those skilled in the art that certain advantages of the within system have been achieved. It should also be appreciated that various modifications, adaptations, and alternative embodiments thereof may be made within the scope and spirit of the present invention. The invention is defined by the following claims.

What is claimed is:

1. A method for content filtering, comprising:
   receiving a plurality of requests for review of various content items, each of the various content items comprising information for presenting to end users over a wide area network;
   routing each of the plurality of requests to at least one of a plurality of reviewing resources, wherein each of the reviewing resources comprises at least one network-connected terminal configured to present content to a human reviewer;
   associating each of the various content items with at least one classification provided by the plurality of reviewing resources after review of the respective content items by a human reviewer; and
   providing classifications from the plurality of reviewing resources to a plurality of local filtering agents, wherein the classifications are configured to allow for a determination of whether associated ones of the various content items are to be presented to end users each having an associated access level.

2. The method of claim 1, further comprising recording the classifications in a database, wherein each of the classifications is associated with an identifier for a respective one of the content items.

3. The method of claim 1, wherein the providing step further comprises providing the classifications for use in filtering content at anonymous client terminals.

4. The method of claim 1, wherein the receiving step further comprises receiving the plurality of requests originating from anonymous requests for content.

5. The method of claim 1, further comprising processing the plurality of requests so as to prevent a portion of the various content items from being reviewed by any human reviewer using the plurality of reviewing resources.

6. The method of claim 1, further comprising processing the plurality of requests so as to prevent personal identifying information from being presented to an human reviewer using the plurality of reviewing resources.

7. The method of claim 1, further comprising presenting a plurality of content items for simultaneous display on a terminal of at least one of the plurality of reviewing resources.

8. The method of claim 7, wherein the presenting step further comprises presenting the plurality of content items as thumbnail images.

9. The method of claim 1, further comprising prioritizing the plurality of requests according to objective criteria.

10. The method of claim 1, further comprising selecting the at least one of the plurality of reviewing resources based on characteristics of respective ones of the content items.

11. A system for content filtering, comprising:
a plurality of client terminals each having communication links to a wide area network;
plurality of local filtering agents, each operatively associated with a respective one of the client terminals so as to control presentation of information thereon;
a reviewing portal comprising a computer connected to the wide area network, the computer configured to receive requests for review of content items from the plurality of client terminals, and to route the requests to a plurality of reviewing resources, wherein each of the reviewing resources comprises a terminal connected to the reviewing portal and configured to present the content items to a human reviewer for classification according to a predetermined filtering scheme.

12. The system of claim 11, further comprising a database operatively associated with the reviewing portal, the database holding human-determined classifications of content items in association with identifiers for the content items.

13. The system of claim 11, wherein the reviewing resources are further configured to display a plurality of content items together as thumbnail images, each thumbnail image corresponding to a content item.

14. The system of claim 13, wherein the reviewing resources are further configured to display a more detailed image of a content item, upon selection of a thumbnail image corresponding to the content item by a human reviewer.

15. The system of claim 11, wherein the local filtering agents are configured to control presentation of content items on respective ones of the client terminals based on classifications provided by human reviewers using the reviewing resources and a predetermined access level for the respective client terminals.

16. The system of claim 11, wherein the local filtering agents are configured to generate the requests for review of content items based on activity of respective associated client terminals.

17. The system of claim 16, wherein the local filtering agents are further configured so as to render the requests for review of content items anonymous.

18. An apparatus for content filtering, comprising:
a plurality of client terminals each connected to a wide area network via a corresponding plurality of agents, each of the plurality of agents controlling access to information from the wide area network based on an access level associated with respective ones of the client terminals; and
a plurality of switches each linked communicatively to respective ones of the plurality of agents, each switch having two or more states each corresponding to a different value of the access level, wherein the access level associated with respective ones of the client terminals is determined by states of respective ones of the plurality of switches.

19. The apparatus of claim 18, wherein the switches comprise software switches settable using a control application running on a central computer connected to each of the client terminals.

20. The apparatus of claim 18, wherein the switches comprise hardware switches settable at a central control panel connected to each of the client terminals.

* * * * *

UNITED STATES PATENT AND TRADEMARK OFFICE
CERTIFICATE OF CORRECTION

| | |
|---|---|
| PATENT NO. | : 8,290,948 B2 |
| APPLICATION NO. | : 10/882718 |
| DATED | : October 16, 2012 |
| INVENTOR(S) | : Shuster et al. |

It is certified that error appears in the above-identified patent and that said Letters Patent is hereby corrected as shown below:

In Column 3, Line 29, delete "wise" and insert -- wide --, therefor.

In Column 5, Line 41, delete "only"" and insert -- only," --, therefor.

In Column 5, Line 59, delete "the a" and insert -- a --, therefor.

Signed and Sealed this
Fifth Day of March, 2013

Teresa Stanek Rea
*Acting Director of the United States Patent and Trademark Office*